(No Model.) 3 Sheets—Sheet 1.

H. E. TAYLOR.
MACHINE FOR TURNING IRREGULAR FORMS.

No. 384,002. Patented June 5, 1888.

Witnesses
Geo. W. Young
N. E. Oliphant

Inventor.
Hilbert E. Taylor.
By Stout & Underwood
Attorneys.

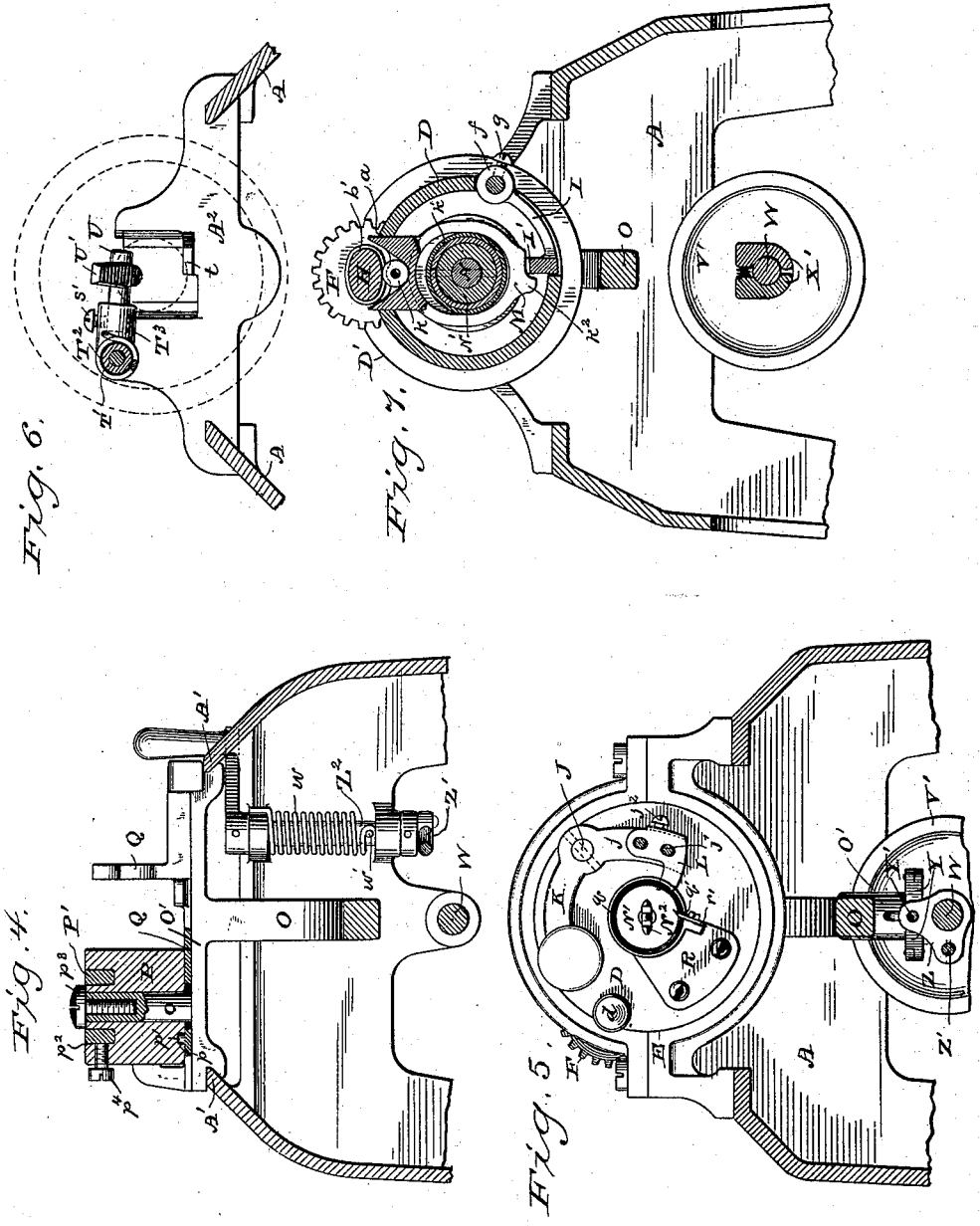

(No Model.) 3 Sheets—Sheet 3.
H. E. TAYLOR.
MACHINE FOR TURNING IRREGULAR FORMS.
No. 384,002. Patented June 5, 1888.
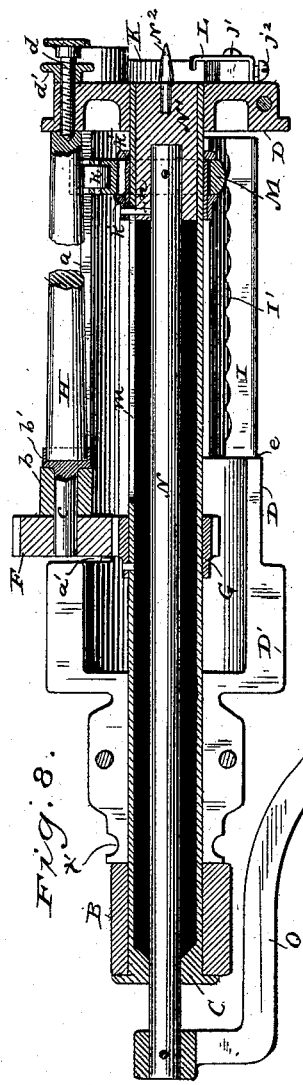
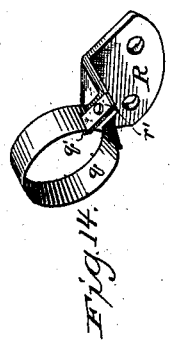
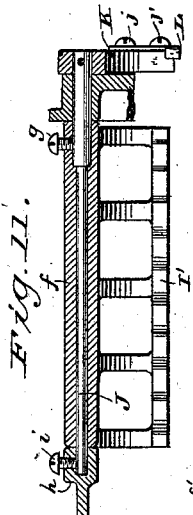
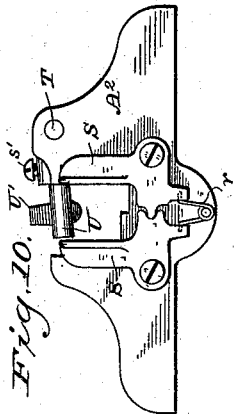
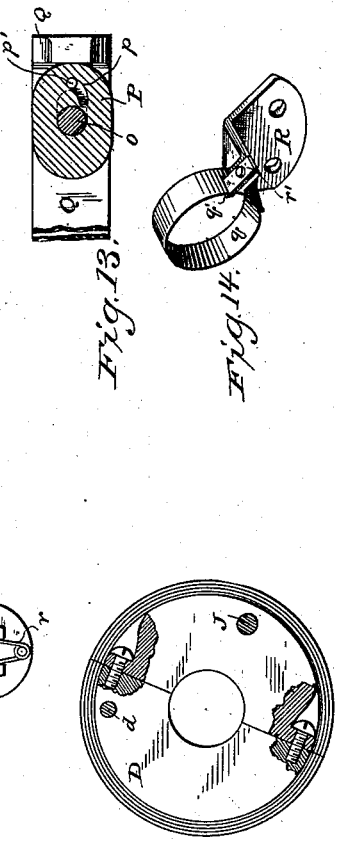
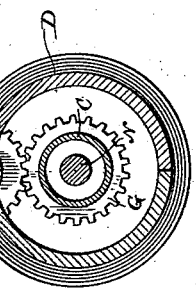
Witnesses.
Geo. W. Young.
N. E. Oliphant.
Inventor.
Hilbert E. Taylor.
By Flint & Underwood
Attorneys.

United States Patent Office.

HILBERT E. TAYLOR, OF BLOOMINGTON, ASSIGNOR, BY DIRECT AND MESNE ASSIGNMENTS, OF ONE-HALF TO MILES D. TAYLOR, OF JANESVILLE, WISCONSIN.

MACHINE FOR TURNING IRREGULAR FORMS.

SPECIFICATION forming part of Letters Patent No. 384,002, dated June 5, 1888.

Application filed September 3, 1887. Serial No. 248,666. (No model.)

*To all whom it may concern:*

Be it known that I, HILBERT E. TAYLOR, of Bloomington, in the county of Grant, and in the State of Wisconsin, have invented certain new and useful Improvements in Machines for Turning Irregular Forms; and I do hereby declare that the following is a full, clear, and exact description thereof.

My invention relates to machines for turning the ends of carriage-bows and other irregular forms; and it consists in certain peculiarities of construction and combination of parts, to be hereinafter described, with reference to the accompanying drawings, and subsequently claimed.

Figure 1:
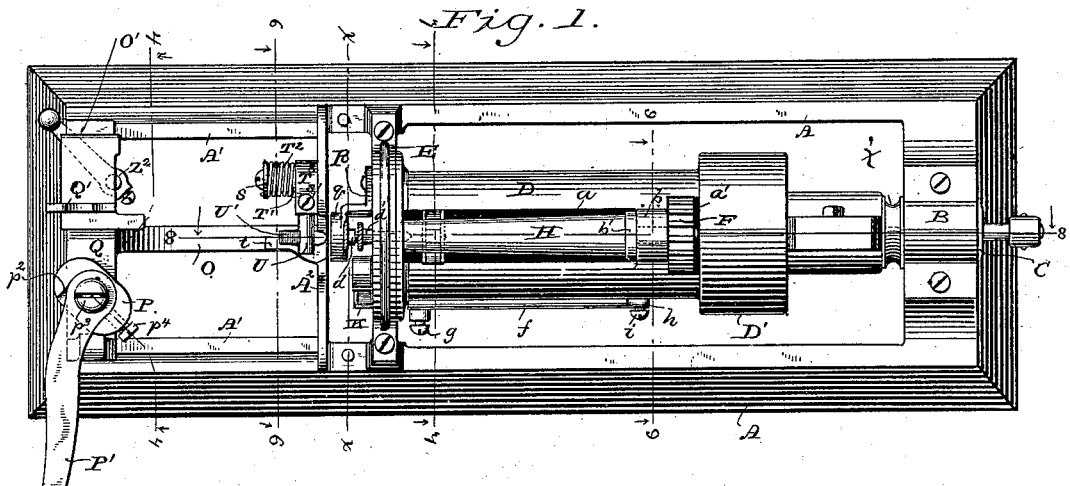
Figure 2:
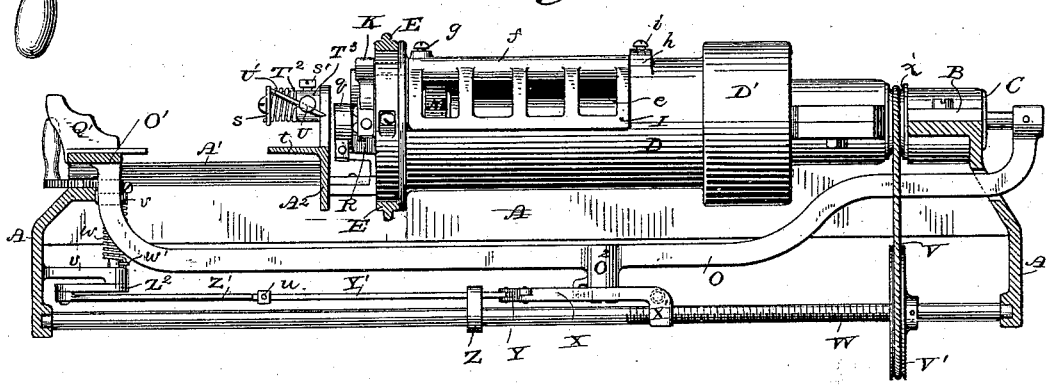
Figure 3:
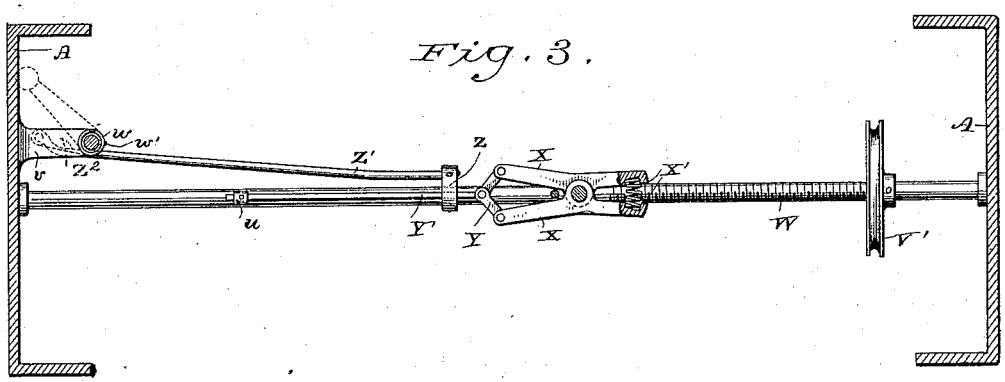

In the drawings, Figure 1 represents a plan view of a machine constructed according to my invention; Fig. 2, a side elevation of the same, partly in section; Fig. 3, a horizontal section showing the feed mechanism in plan; Fig. 4, a section on line 4 4, Fig. 1; Fig. 5, a section on line $x\,x$, Fig. 1, and looking toward the right; Fig. 6, a section on line 6 6, Fig. 1; Fig. 7, a section on line 7 7, Fig. 1; Fig. 8, a section on line 8 8, Fig. 1; Fig. 9, a section on line 9 9, Fig. 1; Fig. 10, a section on line $x\,x$, Fig. 1, looking toward the left and illustrating a pair of self-centering jaws that may be employed instead of the centering and cutting device shown in detail, Fig. 14; Fig. 11, a detail of knife and vibrating apron; Fig. 12, a detail of the cylinder; Fig. 13, a detail section of the clamp, and Fig. 14 a detail view of centering and cutting device.

Referring by letter to the drawings, A represents the main frame of my machine, and rigidly secured in a bearing, B, that forms part of this frame is the rear end of a tube, C. Loosely mounted on the tube C is a cylinder, D, the front head of which is arranged to revolve in a bearing, E, that also forms part of said frame.

The cylinder D is provided with a longitudinal opening, $a$, and at the rear end of this opening is a lug, $b$, that serves as a bearing for the journal $c$ of a pinion, F, the latter entering a peripheral opening, $a'$, in said cylinder and meshing with a gear-wheel, G, fast on the tube C. The journal $b$ of the pinion F is provided with a seat, $b'$, that receives one end of a pattern, H, the other end of this pattern being held by a set-screw, $d$, that passes through the front head of the cylinder A and is provided with a jam-nut, $d'$. The cylinder A is provided with another longitudinal opening, $e$, that is closed by a skeleton frame or apron, I, provided with a sleeve, $f$, through which and the front head of said cylinder is passed a spring-rod, J, the apron being rigidly held on the rod by means of a set-screw, $g$. The inner end of the spring-rod is rigidly held in a lug, $h$, on the cylinder A by means of a set-screw, $i$, and the outer end of this rod carries a bell-crank, K, that has adjustably connected to one arm thereof a knife, L, the latter being held in its adjusted position by means of set-screws $j\,j'\,j^2$. In setting up the machine, the set-screw $i$ is tightened on the spring-rod J, the bell-crank K set in such a position as to give the rod a twist, and the set-screw $g$ tightened to retain said rod in its twisted position, whereby the apron I is held by torsional strain against a collar, M, that is loose on the tube C, and in turn bears against the pattern H, this collar being preferably provided with an anti-friction roller, $k$, to reduce the friction on said pattern.

The collar M has transverse play on the tube C, and is prevented from longitudinal displacement by washers $k'\,k'$, while at the same time this collar is provided with an extension, $k^2$, that comes against the bearing-edge I' of the apron and acts as a stop to prevent rotation. I prefer to provide the bearing-edge I' of the apron I with a series of scallops, as illustrated in Figs. 8 and 11, said scallops being of any desirable contour.

The tube C is provided with a slot, $m$, that serves as a guide for a pin, $n$, that connects one of the washers $k'$ with the head N' of a plunger, N, the latter being arranged inside of said tube and connected by a longitudinal arm, O, to a cross-head, O', that slides on guides A' at the front of the main frame A.

Pivotally connected to a stem, $o$, on the cross-head O' is a block, P, provided with a lever, P', and a cam-shaped recess, $p$, the latter engaging a lug, $p'$, on a transverse sliding plate, Q, that carries a jaw, Q'. The construction just described forms a self-centering clamp that acts to force the article to be turned against a chuck, N², on the plunger-head N' and hold said article firmly in position while being operated upon by the machine.

I prefer to provide the top of the block P with a depression, $p^2$, to receive the rear end of the lever P', the latter being adjustable on a pivot, $p^3$, and secured in its adjusted position by means of a set-screw, $p^4$, as best illustrated in Fig. 1. By the construction just described I am enabled to adjust the lever P' to different angles and have it in the proper position for the hand of the operator, according to different sizes of blanks.

Attached to the front head of the cylinder D is a bracket, R, terminating in a beveled ring, q, that has a slot, q', through which passes the edge of a knife, R', the latter being suitably secured in said bracket. The ring q will center and prevent vibration of the blank being operated upon by the machine, and the knife R' will cut away the corners of said blank, thereby relieving the knife L of so much of the work.

Instead of the bracket R, I may employ the self-centering jaws S, (illustrated in Fig. 10,) said jaws being pivoted to the inner side of a cross-piece, A², and controlled by a spring, r, as illustrated by said figure.

Rearwardly extended from the cross-piece A² is a stem, T, that forms a bearing for a sleeve, T', surrounded by a spiral spring, T², the latter having its ends respectively secured to said sleeve and a washer, s, on the stem. The sleeve T' has a lateral extension, T³, in which is inserted an arm, U, that carries a grooving-knife, U', the latter being retained in any position to which it may be adjusted by means of a set-screw, s', that passes through the extension of said sleeve and bears upon the knife-arm.

Below the grooving-knife and extending rearward from the cross-piece is a supporting-arm, t, for the blank being operated upon by the machine.

The cylinder D is preferably provided with an enlargement, D', that serves as a pulley over which to pass a belt (not shown) that may be driven by any suitable power. The cylinder has its rear end grooved at t' to receive a belt, V, that passes around a pulley, V', on a screw-threaded shaft, W, journaled in the main frame A.

Depending from the arm O of the cross-head O' is a stud, O², to which is pivotally connected arms X X, having their rear ends turned down and adapted to fit upon the screw-shaft W, thereby forming a split-nut, X'. The forward ends of the arms X X are connected by a knuckle-joint, Y, and the latter is in turn connected to a rod, Y', that passes through a block, Z, loose on the shaft W, and is provided with an adjustable head, u, designed to come against said block to automatically actuate the knuckle-joint and open the nut X' at a predetermined time. The block Z is connected by a rod, Z', to a crank-lever, Z², that has its bearings in lugs v on the main frame A, and is surrounded by a spiral spring, w, the latter being fastened at its ends to one of the lugs, and another lug, w', on said crank-lever.

By actuating the crank-lever Z², the sliding block Z is forced against the knuckle-joint Y to close the nut X' on the shaft W, and thus cause the blank to be automatically fed to the knife L, and after this operation takes place the spring w acts to cause an automatic return of said lever and block to their normal positions.

In the operation of my invention the blank to be operated upon is centered and clamped, as above described, and the crank-lever Z² actuated to set the nut X' on the screw-threaded shaft W. The travel of the nut causes the blank to be carried into the tube C, and the rotation of the cylinder carries the pinion F around the stationary gear-wheel G to revolve the pattern H, that is in contact with the loose collar M on the tube C. Accordingly as the pattern H varies in contour, the collar M is forced against the apron I, and the cut of the knife L is thus regulated to give the blank the same shape as said pattern. By having the bearing-edge of the apron provided with scallops, a series of rings are produced on the article operated upon by my machine, and thus said article will not only fit a socket of its exact size, but can also be driven in a socket that is a trifle small. When the head u on the rod Y' comes against the block Z on the shaft W, the nut X' is opened to automatically stop the feed, and as the carriage is drawn back to its normal position the knife U' will cut a longitudinal groove in the article that has been turned, the spring T² holding said knife down to its work, but permitting it to yield to varying thicknesses of the form, whereby a groove of equal depth is cut the entire length of said form.

Ordinarily the knife U' is only employed on the machine when the latter is used for turning carriage-bows, the grooves cut by said knive serving to receive the seams of metal sockets that are placed on these bows.

While my machine is more particularly designed for turning the ends of carriage-bows, it is equally well adapted for turning tool-handles and other irregular forms.

Having thus fully described my invention, what I claim as new, and desire to secure by Letters Patent, is—

1. In a machine for turning irregular forms, the combination of a main frame, a revolving cylinder, a sliding feed-carriage, a pattern mounted on the cylinder, suitable means for imparting an independent rotation to the pattern, a knife carried by the cylinder, and means, substantially as described, for actuating the knife by the rotation of the pattern, as set forth.

2. In a machine for turning irregular forms, the combination of a main frame, a tube stationary on the frame, a revolving cylinder arranged on the tube, a sliding feed-carriage, a pattern mounted on the cylinder, suitable means for imparting an independent rotation to the pattern, a spring-apron forming part of said cylinder, a knife-arm secured to the axis of the apron, and a collar that travels on said tube and has transverse play, whereby it is caused to simultaneously bear against said pattern and apron, substantially as set forth.

3. In a machine for turning irregular forms, the combination of a main frame, a tube stationary on the frame, a revolving cylinder arranged on the tube, a sliding feed-carriage, a pinion journaled to the cylinder and provided with a seat, a pattern clamped between the seat and opposite head of said cylinder, a gear-wheel fast on the tube and arranged to mesh with the pinion, a spring-apron forming part of the cylinder, a knife-arm secured to the axis of the apron, and a collar that travels on said tube and has transverse play, whereby it is caused to simultaneously bear against said pattern and apron, substantially as set forth.

4. In a machine for turning irregular forms, the combination of a main frame, a tube stationary on the frame, a revolving cylinder arranged on the tube, a sliding feed-carriage, a pattern mounted on the cylinder, suitable means for imparting an independent rotation to the pattern, a spring-apron forming part of said cylinder, a knife-arm secured to the axis of the apron, a collar arranged to travel and have transverse play on said tube, so as to simultaneously bear against the pattern and apron, and an anti-friction roller journaled in the collar to come in contact with said pattern, substantially as set forth.

5. In a machine for turning irregular forms, the combination of a main frame, a pattern having a planetary movement and a revolution on its axis, a vibratory knife that is rotated about the work, a bearing that rests against and travels along the pattern to control the vibratory movement of the knife, a sliding feed-carriage, and an automatic stop for the carriage, substantially as set forth.

6. In a machine for turning irregular forms, the combination of a main frame, a pattern having a planetary movement and a revolution on its axis, a vibratory knife that is rotated about the work, a bearing that rests against and travels along the pattern to control the vibratory movement of the knife, a sliding feed-carriage, a screw-threaded shaft, an open nut connected to the carriage and arranged to engage the shaft, a block loose on said shaft, a headed rod knuckle-jointed to the nut and passed through the block, and a crank-rod connected to said block, substantially as set forth.

7. In a machine for turning irregular forms, the combination of a main frame, a pattern having a planetary movement and a revolution on its axis, a vibratory knife that is rotated about the work, a bearing that rests against and travels along the pattern to control the vibratory movement of the knife, a sliding feed-carriage, a screw-threaded shaft, an open nut composed of two arms pivoted to the feed-carriage and having turned-down ends that engage said shaft, a block loose on said shaft, a headed rod passed through the block and knuckle-jointed to the nut-arms, a crank-rod connected to said block, and a spring arranged to return the crank-rod to its normal position after setting the nut, substantially as set forth.

8. In a machine for turning irregular forms, the combination of a main frame, a pattern having a planetary movement and a revolution on its axis, a vibratory knife that is rotated about the work, a bearing that rests against and travels along the pattern to control the vibratory movement of the knife, a longitudinal sliding feed-carriage, a transverse plate loosely mounted on the carriage and provided with a jaw, a pivoted block in opposition to the jaw and provided with a cam-shaped recess that engages a lug on the transverse plate, and a lever for actuating the block, substantially as set forth.

9. In a machine for turning irregular forms, the combination of a main frame, a pattern having a planetary movement and a revolution on its axis, a vibratory knife that is rotated about the work, a bearing that rests against and travels along the pattern to control the vibratory movement of the knife, a longitudinal sliding feed-carriage, a transverse plate loosely mounted on the carriage and provided with a jaw, a pivoted block in opposition to the jaw and provided with a cam-shaped recess that engages a lug on the transverse plate, a lever adjustably secured to the block, and a set-screw for holding the lever in its adjusted position, substantially as set forth.

10. In a machine for turning irregular forms, the combination of a main frame, a pattern having a planetary movement and a revolution on its axis, a vibratory knife that is rotated about the work, a bearing that rests against and travels along the pattern to control the vibratory movement of the knife, a sliding feed-carriage, a revolving bracket arranged in advance of the vibratory knife and terminated in a ring, and a knife secured to said bracket to have its cutting-edge inside the ring, substantially as set forth.

11. In a machine for turning irregular forms, the combination of a main frame, a pattern having a planetary movement and a revolution on its axis, a vibratory knife that is rotated about the work, a bearing that rests against and travels along the pattern to control the vibratory movement of the knife, a sliding feed-carriage, and a grooving-knife arranged to operate upon the form during the return movement of the feed-carriage, substantially as set forth.

12. In a machine for turning irregular forms, the combination of a main frame, a pattern having a planetary movement and a revolution on its axis, a vibratory knife that is rotated about the work, a bearing that rests against and travels along the pattern to control the vibratory movement of the knife, a sliding feed-carriage, a loose sleeve provided with a lateral extension, an arm adjustably held in this extension, a grooving-knife secured to the arm to operate upon a form during the return movement of the feed-carriage, and a spring arranged upon the sleeve and connected to said extension thereof, substantially as set forth.

13. In a machine for turning irregular forms, the combination of a main frame, a revolving cylinder, a sliding feed-carriage, a pattern mounted on the cylinder, suitable means for imparting an independent rotation to the pattern, a spring apron forming part of the cylinder and having a scalloped bearing-edge, a bearing that rests against and travels along the pattern and scalloped edge of the apron, and a knife-arm secured to the axis of said apron, substantially as set forth.

14. In a machine for turning irregular forms, the combination of a main frame, a tube stationary on the frame, a revolving cylinder arranged on the tube, a pattern mounted on the cylinder, suitable means for imparting an independent rotation to the pattern, a sliding cross-head carrying a clamping mechanism, a plunger operative in the tube and provided with a chuck, an arm connecting the cross-head and plunger, a screw-feed detachably united to the plunger, an apron forming part of said cylinder, a knife-arm secured to the axis of the apron, and a collar arranged on said tube to be actuated by the plunger and travel along the pattern and bearing-edge of said apron, substantially as set forth.

15. In a machine for turning irregular forms, the combination of a main frame, a screw-threaded shaft journaled in the frame, a pulley fast on the shaft, a feed-carriage, an open nut connected to the carriage and arranged to engage said shaft, suitable means for closing and opening the nut, a revolving cylinder mounted on said frame, a belt connecting the cylinder and feed-shaft pulley, a pattern mounted on said cylinder, suitable means for imparting an independent rotation to the pattern, an apron forming part of the cylinder, a knife-arm secured to the axis of the apron, and a bearing that rests against and travels along said pattern and bearing-edge of the apron, substantially as set forth.

In testimony that I claim the foregoing I have hereunto set my hand, at Bloomington, in the county of Grant and State of Wisconsin, in the presence of two witnesses.

HILBERT E. TAYLOR.

Witnesses:
P. BARTLEY,
M. F. WOODHOUSE.